March 22, 1966 A. W. JACOBS 3,241,767
AUTOMATIC SPRINKLER CONTROL SYSTEM AND COMPONENTS THEREOF
Filed Sept. 6, 1962 5 Sheets-Sheet 1

INVENTOR.
ARTHUR W. JACOBS
BY
Oberlin, Maky & Donnelly
ATTORNEYS

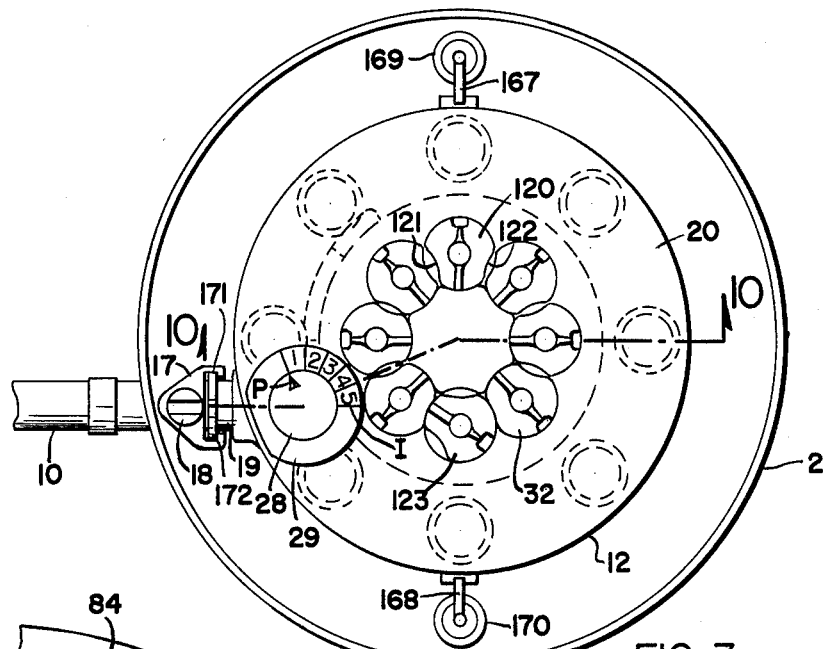

INVENTOR.
ARTHUR W. JACOBS
ATTORNEYS

INVENTOR.
ARTHUR W. JACOBS
BY
*Oberlin, Maky & Donnelly*
ATTORNEYS

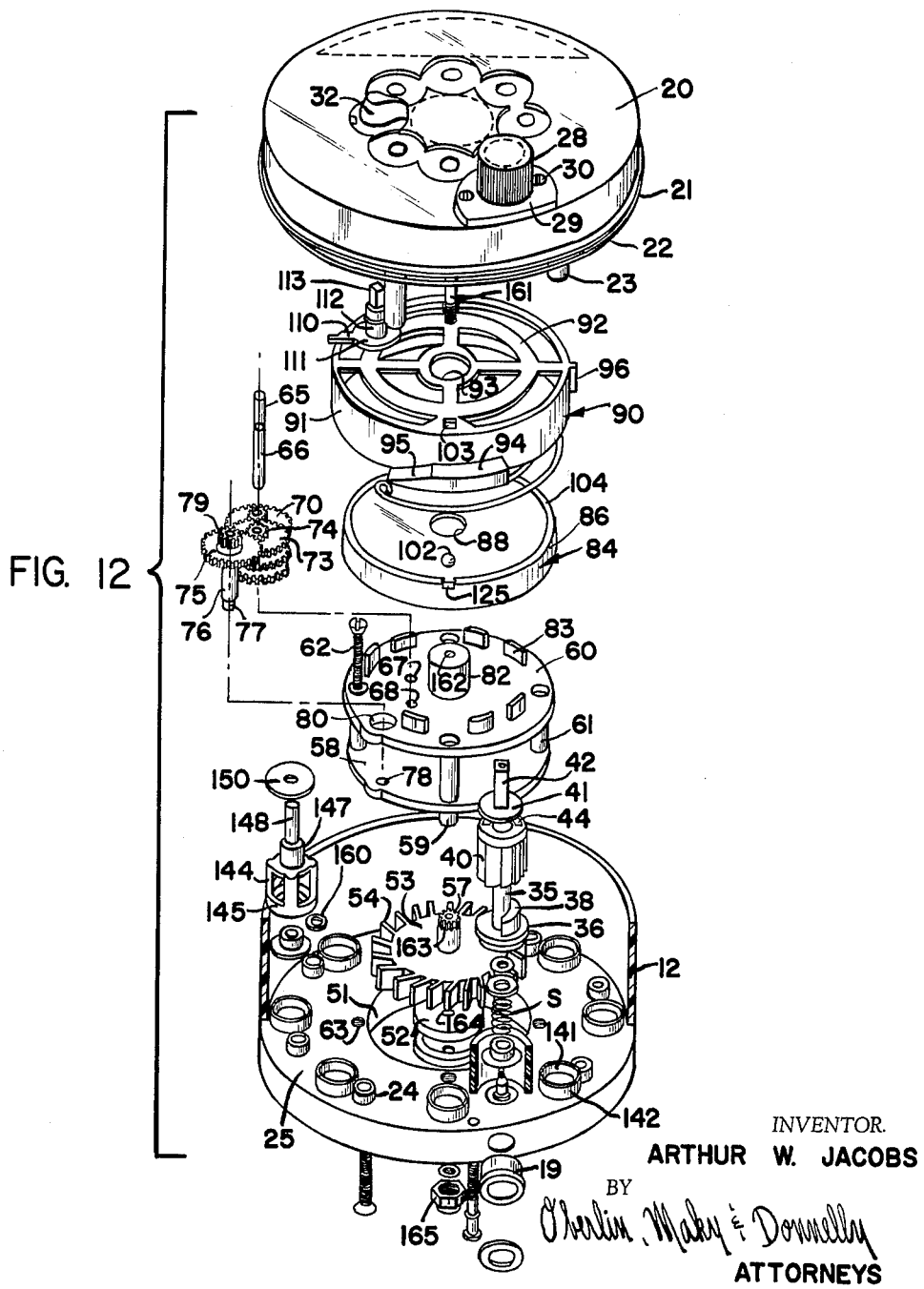

United States Patent Office 3,241,767
Patented Mar. 22, 1966

3,241,767
AUTOMATIC SPRINKLER CONTROL SYSTEM AND
COMPONENTS THEREOF
Arthur W. Jacobs, 5994 Columbia Road,
North Olmsted, Ohio
Filed Sept. 6, 1962, Ser. No. 221,806
10 Claims. (Cl. 239—66)

This invention relates generally, as indicated, to an automatic sprinkler control system and components thereof and more particularly to an underground automatic lawn sprinkling system comprising a plurality of pop-up sprinkling heads and means to transfer the water pressure from one head to the next with each head operating on a predetermined time-cycle.

In many communities during the summer months, the water pressure drops to a point where sprinkling systems employing pop-up sprinkling heads will not operate properly. Moreover, in timed sprinkling systems, when the water pressure drops, no compensation is made for the decreased flow and lawns are not watered as long as desired. In some complex watering systems, pumps and electrical timers are required which necessitate an additional expense for wiring and a substantial amount of underground plumbing. With the present invention, the water is directed principally through only one of the plurality of outlets for a period of time dependent upon the provided water pressure. Moreover, this system will function properly on as little as 15 pounds of water pressure.

It is accordingly a principal object of the present invention to provide an inexpensive sprinkler system and control which will properly distribute the desired amount of water over the lawn or the like regardless of the amount of water pressure.

A further principal object is the provision of a lawn sprinkling system with a plurality of lawn sprinkler heads which will be operated sequentially for a duration controlled by the water pressure.

A further object is the provision of a lawn sprinkler system and control employing a plurality of sprinkler heads which are operated sequentially through one or more sprinkling cycles.

It is a still further object to provide such a sprinkling system and control wherein the number of complete sprinkling cycles can be preselected.

Yet another object is to provide a lawn sprinkler unit which can quickly and easily be installed without unsightly damage to turf or top soil.

A yet further object is the provision of a lawn sprinkler system which can employ primarily plastic molded components and plastic hoses.

Still another object is the provision of a sprinkler system having a plurality of sprinkler heads wherein each sprinkling head can be included in or omitted from the sprinkling cycle.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 3 is an enlarged top plan view with the cover removed of the outer housing of the present invention;

FIG. 4 is a view similar to FIG. 3 with the top of the inner main housing removed;

FIG. 5 is a top plan view similar to FIG. 4 with the valve actuator removed;

FIG. 6 is an enlarged fragmentary view partially in section of a portion of the internal gear shown in plan in FIG. 5;

FIG. 12 is an exploded view of the mainifold housing and components thereof.

Figure 1:
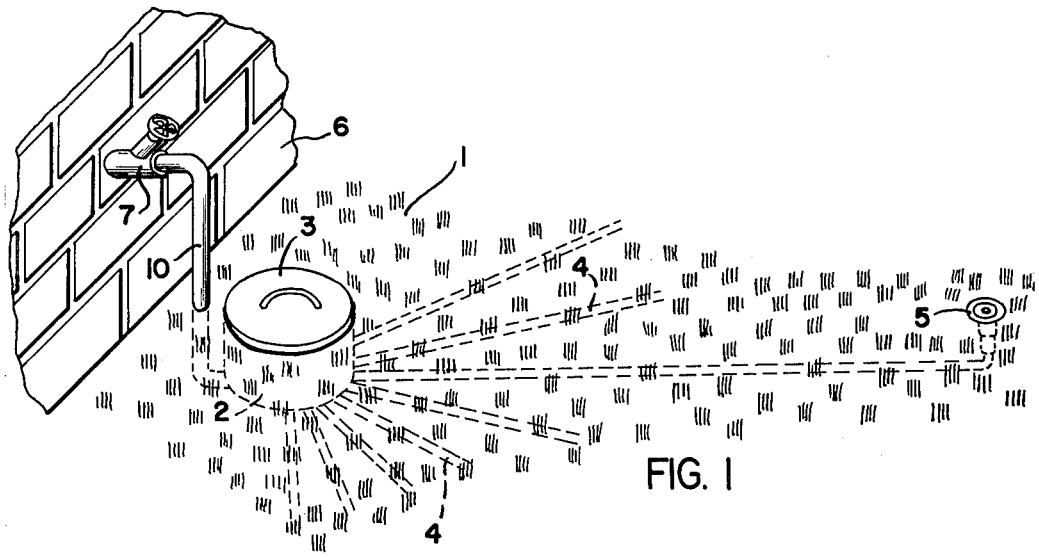
FIG. 1 is a fragmentary schematic view of an installation of a sprinkler system in accordance with the present invention.
Figure 2:
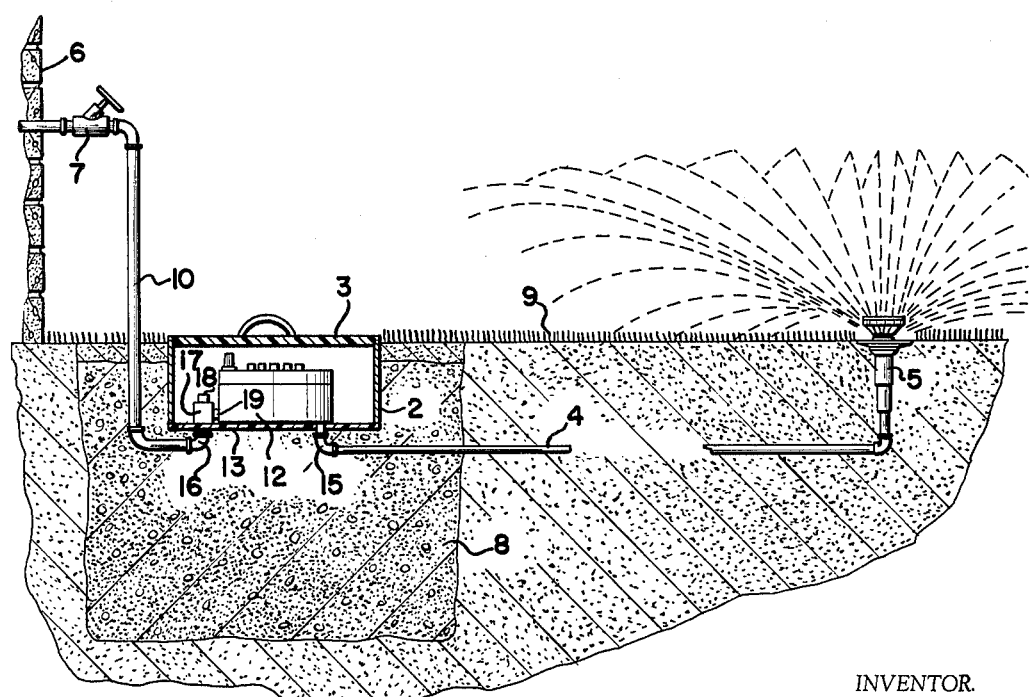
FIG. 2 is a fragmentary vertical section of such sprinkler system.
Figure 7:
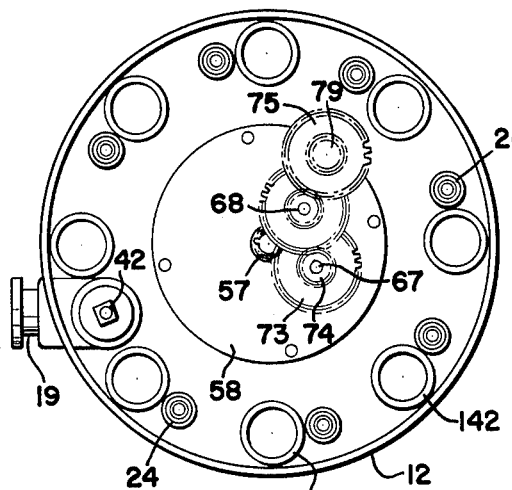
FIG. 7 is a top plan view similar to FIG. 5 with such internal gear and the bottom lower gear housing removed.
Figure 8:
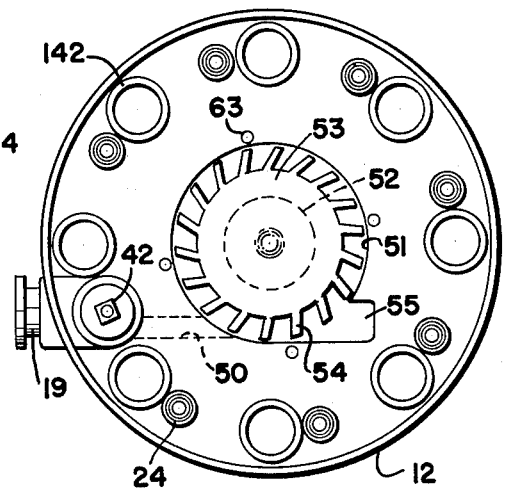
FIG. 8 is a top plan view similar to FIG. 7 with the bottom lower gear housing and the reducer gears removed.

Referring now to the annexed drawings and more particularly to FIGS. 1 and 2, it will be seen that the present invention is adapted to be installed in the lawn or turf 1 and includes an outer or manifold housing 2 provided with a cover 3 from which extends as many as eight flexible plastic water pipes 4 each leading to a pop-up sprinkling head 5 with the latter being strategically arranged about the lawn 1 to water the desired area.

In installation the system, first consideration is given to the layout of the area to be sprinkled and each sprinkler head which may, for example, be capable of covering an area of 30 feet in diameter, may be layed out as nearly as possible in 25 foot squares. The center of each square may represent the position for the sprinkler head 5. The spot for the manifold housing 2 is then selected and may be placed in the center of the area to be sprinkled although additional feed pipe would be required. If a central location is impossible, the outlets at the housing 2 for the sprinkler pipes 4 can swivel and can be pointed in any direction desirable. As shown, the housing 2 is placed fairly close to a wall 6 of a house or like building fairly close to a spigot 7. The hole for the manifold housing 2 may be dug approximately 20 to 24 inches in diameter and about 18 to 20 inches deep. The bottom of the hole may be filled with slag or gravel 8 to position the top surface of the cover 3 approximately ½ inch above the ground level 9. After the hole for the manifold housing is dug, shallow trenches can be placed in the turf from 4 to 6 inches deep to each of the selected sprinkler head spots and also a trench can be dug for the supply line 10 leading from the spigot 7 to the manifold housing. The supply line 10 will preferably be ½ inch polyethylene pipe and the various sprinkler lines 4 will preferably be ¾ inch pipe of suitable plastic material. In view of the selection of material, the trenches for such pipe need not be so deep as to go below the frost line since freezing will not harm the pipes.

Situated centrally within the manifold housing 2 is a main motor or control housing 12 which is mounted on the bottom wall 13 of the manifold housing 2. Such bottom wall may be of molded plastic material whereas the circumferential wall of the housing may be made of galvanized sheet metal, for example. The bottom wall is provided with a plurality of openings through which project elbow fittings 15 secured to the proximal end of each of the sprinkler lines 4. These elbows then provide direct fluid communication between the main or control housing 12 and the sprinkler heads 5. The inlet pipe 10 is connected to an elbow 16 which extends upwardly into a central housing 17 which may be provided with a removable filter cartridge 18. Horizontal conduit is then connected from the main housing 12 to the filter housing 17 as shown at 19. It will, of course, be understood that although only one elbow fitting 15 and sprinkler line 4 is shown in FIG. 2, that there are eight such fittings and lines extending from the bottom wall 13 of the manifold housing 2.

Referring now additionally to FIGS. 3 through 12, it will be seen that the main housing 12 situated within the manifold housing 2 comprises a cover 20 provided with a peripheral enlarged lip 21 which snugly fits over the upstanding top edge of the wall of the housing 12. (See FIG. 10.) An O-ring 22 may be provided between the cover and the wall of the housing properly to seal the same when the two are clamped together. The cover is molded of one piece of a plastic material such as polyethylene or nylon and is provided with a plurality of peripherally spaced downwardly projecting columns 23 which abut pedestals 24 molded into the bottom 25 of the housing 12. O-rings or the like may be positioned between the column and pedestal abutments and elongated fasteners such as screws or nut and bolt assemblies may be provided passing upwardly through the bottom 25 of the housing through the pedestals and into the columns 23 properly to clamp the cover in position.

The cover is provided with an upstanding shut-off valve control knob 28 projecting upwardly through a dial ring 29 which may be secured to the top of the cover by the flat head screws 30 shown in FIG. 12. Also, centrally clustered on the cover 20 are eight actuator stop knobs 32, one for each head 5 of the sprinkler system. The control knob 28 functions not only to lift the inlet valve head 33 from the seat 34 to admit water into the main housing 12 but also serves to preselect the number of cycles through which the system will operate. As seen in FIG. 3, the dial ring 29 may be provided with a scale indicia shown at I and a pointer P on the knob may be positioned along the scale to provide the desired number of cycles. The stem of the shut-off valve is actually comprised of two pieces and the head 33 is mounted on a stem 35 which passes through a lower cam block 36 with a spring S being interposed between such block and the head 33 to hold the same in seating engagement.

An upstanding peripheral inclined circular cam 37 is formed on the block 36 having a helical top cam surface 38 which cooperates with a similar surface 39 on the bottom of a ratchet portion 40 formed integrally with the stem 35. On the top of the cam portion 40 of the stem 35, there is provided a drive set cam 41 having a square stem 42 and an eccentric pin 42 projecting into a helical stop slot 44 which engages the end of such slot. The square stem 42 fits within a square downwardly projecting opening 46 in the knob 28 and a spring 47 between the knob and the top of the stem 42 holds the drive cam 41 into engagement with the ratchet portion 40 of the stem 35. The pin and slot connection the drive cam and the ratchet portion of the lower stem ensures that the pin and ratchet can be driven in only one direction by the knob 28. If the knob is turned in the opposite direction, the pin 43 will merely ride up the helical slot 44 moving the drive cam 41 upwardly against the pressure of the spring 47. This clutch arrangement is provided to preclude an operator from forcibly turning the knob in the wrong direction since the cam surface 39 is provided with a step 48 which engages the vertical wall of the projection 37 precluding movement of the knob in a complete clockwise direction as viewed in FIG. 3.

When the knob is moved in a counterclockwise direction, the pin 43 engages the end of the slot 44 and rotates also the stem 35 in such counterclockwise direction causing the engagement of the cam surfaces 38 and 39 to elevate the valve head 33 against the pressure of the spring S providing fluid communication between the conduit 19 and the water inlet 50. The slope of the cam surfaces 38 and 39 is such that the spring pressure will not cause the stem or the valve member to rotate in an opposite direction automatically to close the valve, but the friction between the cam surfaces will hold the valve open until shut-off in the manner hereinafter described.

The inlet passage 50 extends tangentially into a circular recess 51 in the bottom wall 25 of the main housing 12. An annular lower nylon bearing member 52 may be situated in such recess on which an impeller 53 is loosely supported. Water then entering the recess from the passageway will impinge against the blades 54 of the impeller to rotate the same in a counterclockwise direction as viewed in FIG. 8. Such recess is provided with an enlargement 55 opposite the passage 50 so that the water entering the recess will then flow freely into the main housing 12 after having imparted motion to the impeller. The impeller, which may be molded of one piece of nylon or like plastic material, is provided with a center post 56 having a relatively small drive pinion 57 formed on the top thereof. In the assembled position, this post with such pinion projects through a central opening in a bottom gear housing member 58. Such housing member is in the form of an annular plate having feet 59 supporting the same on the bottom 25 of the housing 12. An upper gear housing 60 in a similar plate form is supported on the lower housing plate by means of the posts 61 with both the post 61 and the feet 59 being hollow so that elongated threaded flat head screws 62 may pass therethrough so that both the housing plates 58 and 60 may be secured together and the housing thus formed secured to the bottom wall 25 of the main housing 12. Such screws 62 may be seated in threaded openings 63 in such bottom wall. (See FIG. 12.)

Jack shafts 65 and 66 fit in aligned openings 67 and 68 in both the top and bottom gear housing plates. Mounted on each jack shaft are three nylon molded reduction gears 70, 71 and 72 each including a large gear 73 and a small gear 74. Such gear units may be molded of one piece nylon, there being three on each shaft with the large gears meshing with the small gears of the gear unit on the opposite shaft. The small gear 74 on the top gear unit on the shaft 66 is in mesh with a molded nylon gear 75 which includes a mounting shaft 76 having a reduced end portion 77 which fits within aperture 78 in the lower gear housing plate 58. The molded nylon gear 75 also includes a central projecting pinion 79 which projects upwardly through a somewhat larger aperture 80 in the upper gear housing plate 60.

The upper gear housing plate includes a central boss 82 and a plurality of arcuate peripheral circumferentially spaced projections 83 which support a ring gear unit 84. The pinion 79 projecting through the upper gear housing plate 60 is in mesh with the internal gearing 85 formed on the downwardly extending flange 86 of such internal gear unit 84. The top of the internal gear unit is provided with an aperture 88 which fits rather closely over the upstanding projection 82 of the upper gear housing plate 60.

It can then be seen that water entering the main housing 12 through the valve mechanism 33, 34 will enter the passageway 50 entering the recess 51 tangentially of the impeller 53 rotating the same rather rapidly which in turn rotates the pinion 57 on the upwardly projecting shaft 56. Through the reduction gear train mounted on the parallel jack shafts 65 and 66, the gear 75 will be driven rather slowly rotating the pinion 79 which very, very slowly turns the internal gear unit 84 due to the meshing engagement of the pinion 79 and the internal gearing 85.

Figure 10:
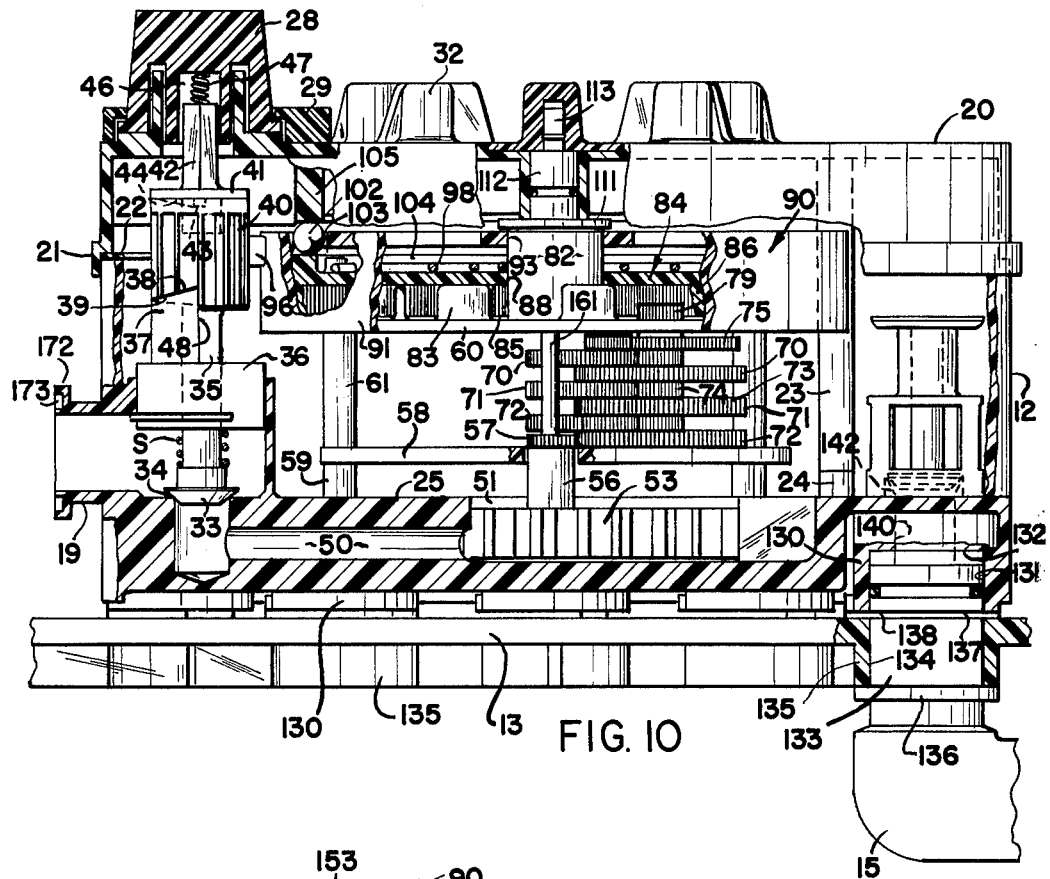
FIG. 10 is an enlarged vertical section of the main housing taken substantially on the line 10—10 of FIG. 3.

An annular valve actuator 90 is mounted on top of the internal gear unit 84 and such actuator may be of molded plastic material comprising a peripheral vertically extending flange 91 and a top frame 92 having a central aperture 93 which fits over the center boss 82 of the top gear housing plate 60 projecting through the hole 88 in the internal gear unit 84. The flange or skirt 91 of the valve actuator 90 is provided with a valve lifting cam 94 having a sloping leading top cam surface 95 and a pawl or dog 96. The pawl projects from the top of the skirt 91 whereas the cam 94 projects from the bottom of such skirt. As seen in FIG. 10, the pawl 96 is adapted to engage the ratchet portion 40 of the valve stem 35 and as the valve actuator rotates past such valve stem, the pawl will index the valve stem through an arcuate movement equal to the circumferential spacing of the longitudinal projections on such ratchet portion 40 or one of the units on the scale I.

The valve actuator 90 is drivingly connected to the internal gear unit 84 by means of a spiral coiled flat spring 98 of circular cross-section. As seen in FIG. 5, the ends of the spring are provided with loops which fit about stub projections 99 and 100 projecting up from the internal gear unit and downwardly from the valve actuator, respectively. Such spring thus provides a resilient lost motion connection between the internal gear unit 84 and the valve actuator 90 permitting relative resilient movement of such components. The internal gear unit and the valve actuator are also drivingly interconnected by a steel ball 102 which rides within a square opening 103 in the top frame 92 of the valve actuator 90. When the components are properly assembled, the ball will be held for rolling movement on the top annular projection 104 of the valve actuator 84 and the annular depending flange 105 which is integrally formed with the cover 20. When supported on the annular track 104, the ball 102 will normally project substantially above the opening 103. There is a substantial clearance between the bottom of the annular flange 105 of the cover 20 and the top of the valve actuator when the components are assembled. Within such clearance, there is provided the fingers 110 of actuator stops 111 which are mounted on shafts 112 having squared tops 113 which fit within squared recesses in the bottoms of the actuator stop knobs 32 mounted on the top of the cover. Suitable O-rings may be provided ensuring a water-tight seal for such shafts projecting upwardly through the cover into the actuator stop knobs.

Figure 9:
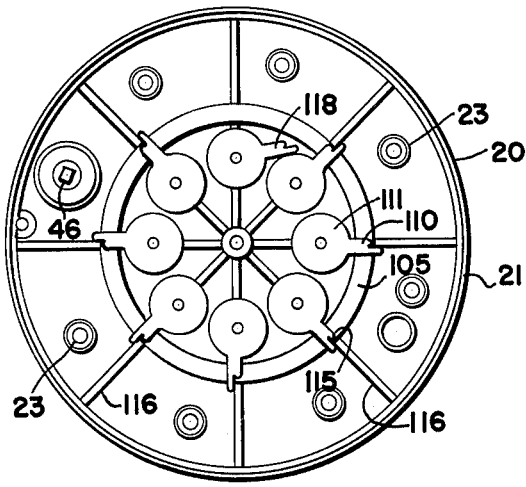
FIG. 9 is a plan view of the bottom of the top of the main housing.

As seen in FIG. 9, the ends of such fingers 110 are provided with stepped portions 115 which engage radially extending reinforcing webs 116 extending between the annular flange 105 and the skirt of the cover 20. Thus when the actuator stop knobs are rotated in a counterclockwise direction as viewed in FIG. 9, the fingers engage such flanges and the stop knobs will then be in the "on" position. Rotation of the stop knobs in a clockwise direction as viewed from the underside of the cover in FIG. 9 will move the fingers to the position shown at 118 engaging the adjacent actuator stop and the stop knob will then be in the "off" position.

As seen more clearly in FIG. 3, each of the stop knobs is provided with an annular flange or skirt portion 120 provided with arcuate recesses 121 and 122. These arcuate recesses permit the turning of adjacent stop knobs to the "off" position, but preclude two successive stop knobs from being turned to such "off" position. Accordingly, as seen at the bottom of FIG. 3, the stop knob shown at 123 has been turned to the "off" position and the annular flange 120 thereof interfits in the arcuate recesses of the adjacent stop knobs. With such interfitting, the adjacent stop knobs are precluded from being turned off. In this manner, only every other stop knob can be turned to the "off" position. Since there are eight outlets, eight distribution valves as hereinafter described therefor, and eight actuator knobs, this then gives the operator the selection of distributing water during one cycle through all eight outlets, through seven turning off but a single outlet, through six turning off two non-adjacent outlets, through five by turning off three non-adjacent outlets, or through four turning off every other outlet. When the ball 102 is within the cage or opening 103 riding on the rail 104, and the impeller 53 is driving the internal gear slowly with the spring 98 in its unstressed condition, the actuator 90 will rotate very, very slowly until the projecting ball 102 contacts an extending finger 110 of one of the stop actuators 111. This will then halt the actuator 90 in position to maintain one of the selected valve outlets open as hereinafter described while the internal gear unit 84 continues slowly to move. The continued slow movement of the internal gear unit 84 with respect to the actuator 90 will stress the spring 98. The rail 104 is provided with a circumferentially elongated notch 125 which will catch up to the opening 103 in the valve actuator and when aligned with such opening, the notch then permits the ball 102 to drop slightly and be moved under the projecting finger 110. The spring 98 then unstresses moving the actuator 90 forwardly to open the next valve in sequence. The notch 125 is such that the ball 102 when clear of the projecting finger 110 will pop back up onto the surface of the rail 104 to permit the actuator to continue its movement. Thus the movement of the actuator 90 is not uniformly continuous as is the slow movement of the internal gear unit 84.

Since the opening 103 in the actuator 90 normally precedes the notch 125, it can be seen that the actuator will be held against movement by engagement of the ball 102 with the projecting finger 110 of the various actuators 111 controlled by the actuator knobs 32. As many as every other actuator knob may be turned to the "off" position allowing the actuator to move therepast without dwelling to maintain the respective valve open.

The bottom 25 of the main housing 12 is provided with downwardly projecting bosses 130 having vertically extending passageways 131 terminating in shoulders 132 as seen in FIG. 10 which receive the upwardly projecting portions 133 of the elbows 15. These bosses and, of course, such elbows are arranged peripherally and equally spaced about the main housing and, of course, the outer manifold housing. Such openings 131 are aligned with equally spaced openings 134 provided in bosses 135 in the bottom wall 13 of the manifold housing 2. The elbows 15 are provided with stop flanges 136 which abut against such bosses and in such position, annular grooves 137 in such upwardly projecting portion of the elbows will be aligned with the top surface of the bottom wall 13 of the manifold housing 2. Horseshoe snap rings 138 may be inserted in each such groove and will serve firmly to lock the elbows in place. The bottoms of the bosses 130 then are supported on the snap rings with the ends of the extensions 133 projecting upwardly into the openings 131 in such bosses. O-rings or the like 139 may be employed to provide the requisite water seal between the elbows and the bosses in the bottom 25 of the main housing 12. In such position, the elbows may be swiveled about their vertical axes to extend in any desired direction.

More narrow passages 140 extend upwardly from the shoulders 132 at the top of the enlarged opening 131 and terminate in a flared surface 141 in an annular lip 142 projecting above the top suface of the bottom 25. Accordingly there will be eight such annular projections spaced peripherally about the bottom of the main housing 12. The flared upper ends of the passages 141 within the annular lips 142 serve as seats for outlet valves, each composed of a valve body 144 which has a bottom annular ring 145 closely fitting over the respective lip 142 holding the valve body firmly in its shown upright position. The top of the valve body is provided with a cylindrical stem retainer 147 through which slidably fits the valve stem 148. On the bottom of each such valve stem, there is provided a valve head 149 which cooperates with the respective flared surface of the outlet passageaway to open and close communication between the interior of the housing 12 and such passageway as the stem is moved vertically. The top of each stem is provided with an annular guide plate 150 having a beveled bottom edge as shown at 151.

Figure 11:
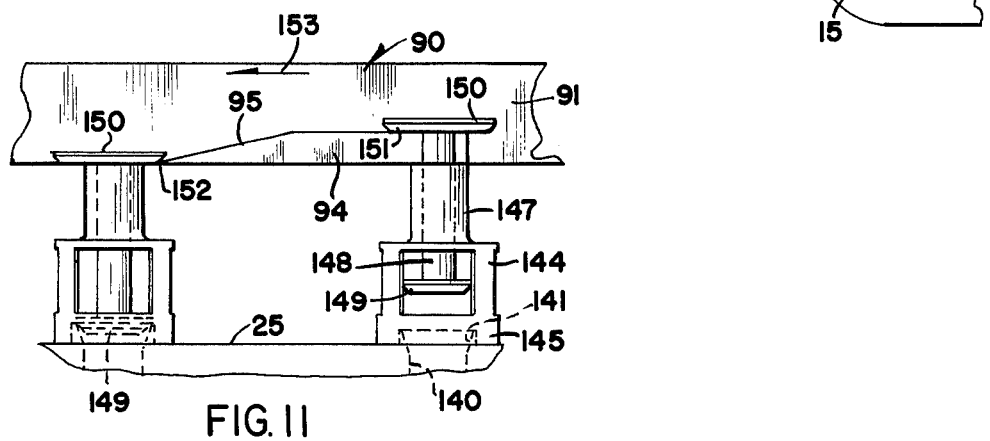
FIG. 11 is a fragmentary side elevation of the valve actuator illustrating the manner in which it sequentially opens the valves within the main housing.

Referring now to FIG. 11, it will be seen that when the valves are in the down or closed position, the guide plates 150 will be positioned just above the leading knife edge 152 of the cam 94. Accordingly, as the valve actuator 90 rotates in the direction of the arrow 153, the knife edge 152 will engage under the valve guide 150 elevating the valve stem and head to open fluid communication between the housing 12 and the particular outlet passage. It is noted, as seen more clearly in FIG. 11, that the circumferential extent of the valve lifting cam 94 is such that at least one valve will always be open.

The various components of the system are primarily such that they can be readily manufactured and assembled from molded plastic parts. Once the various elbows are secured in place through the bottom of the outer housing and into sealed relationship with the inner housing, the various parts of the motor and transmission can then be assembled. First, the nylon bearing will be positioned in place and then the impeller. The bottom gear housing plate 58 will be positioned and after the gear train is in position, then the top gear housing plate 60 can be assembled and then secured with the screws 62. The internal gear unit 84 will be positioned on top of such gear housing and the spring secured in place. The actuator 90 is then positioned and secured in the opposite end of the spring and the ball 102 is dropped in place. After the valves are properly force-fitted about the upstanding lips 142, the cover is then secured in place with the O-ring 22 and O-rings 160 being positioned between the posts 23 and the pedestals 24. A pin 161 may be provided extending downwardly from the cover through the openings 93, 88 and the central opening 162 in the boss 82 and through the vertically extending opening 163 in the impeller 53 and finally through the central hole 164 in the bearing 52. This pin then maintains the impeller properly centered in the recess 51 and a nut or other fastener 165 may be employed to secure the pin 161 through the bottom 25 of the housing 12.

As seen in FIG. 3, hold down latches 167 and 168 may additionally be provided mounted on pedestals 169 and 170 respectively firmly to hold the inner housing 12 centrally within the manifold housing 2. The upstanding projection 17 of the filter housing is provided with a vertical slot 171 into which the flange end 172 of the passage 19 slides as the bottom of the housing 12 is positioned in place. Such flanged end 172, as seen in FIG. 10, is provided with a longitudinally outwardly directed annular groove 173 to accommodate a suitable O-ring or the like sealing the inlet passage for the housing 12 to the filter housing 17.

*Operation*

With the sprinkler system properly installed, the operator merely removes the exposed cover plate 3 of the manifold housing 2 to expose the top or cover 20 of the inner or motor housing 12. By moving the actuator knobs 32, the operator may by-pass as many as four outlets to provide concentrated sprinkling in certain other areas. With the outlets then selected, the operator turns the control knob 28 in a counterclockwise direction causing the cam surface 39 to ride up the cam surface 38 elevating the valve head 33 to open fluid communication to the inlet passage 50. The operator at this time sets the pointer on the knob 28 to the desired number of complete cycles for the sprinkler system. The cover is then replaced and the lawn can be left unattended in that once the desired number of cycles is completed, the cam surface 39 will ride over the vertical edge of the cam projection 37 to snap downwardly closing the inlet valve to turn off the sprinkler system.

Water now entering through the inlet passage 50 impinges the blades of the impeller 53 to cause the same to rotate rapidly at a r.p.m. directly proportional to the water pressure. The impeller 53 will then be rotated at a relatively high velocity as the water enters the recess 51 from the passageway 50 and floods into the interior of the housing 12. By means of the meshing reduction gear trains mounted on the jack shafts 65 and 66, the velocity of the impeller is reduced to a very slow rotational speed as found in the pinion 79 which meshes with the internal gearing 85. This then rotates the internal gear unit 84 quite slowly with even such slow speed being thus directly proportional to the water pressure or the amount of water entering the main housing 12. As the valve actuator 90 rotates, the valve lifting cam 94 will move beneath the guide plates 150 elevating the stems and thus the respective valve heads in succession as the cam 94 moves beneath the respective guide plates 150 for each valve. Such guide plates are elevated opening the valves and the guide plates then ride up the cam surface 95 to the elevated position shown at the right in FIG. 11. As the cam moves on, it will pass out from under the guide 150 and the back pressure in the respective outlet lines acting upon the top of the valve head will automatically snap the valve shut. By this time, the next preceding valve has been opened and fluid will be directed through the next outlet. It is noted that the cam 94 is of such length that there will always be at least one outlet valve open. The valve actuator will dwell beneath the guide plate 150 of the selected valve as determined by the actuator knobs 32. This selection by such knobs places the fingers 110 in the path of the ball 102 to stop rotation of the actuator at the desired position. When the notch 125 catches up with the ball and the ball is then permitted to drop under the extended finger, rotation of the actuator will proceed as the spring 98 returns to its unstressed condition. It is, of course, noted that even if the actuator knob is turned to the "off" position, the valve for the selected outlet will still open momentarily as the spring drives the actuator cam therepast to bring the ball 102 against the next extended finger in the cycle of operation. As the cam actuator completes one full cycle of rotation, the dog 96 will engage the ratchet portion 40 of the stem 35 of the shut-off valve moving such stem through approximately 10° of rotation. This causes the cam surface 39 to move about cam surface 38 and depending upon the initial setting of the knob, as many as five revolutions may be obtained. It will, of course, be understood that each outlet may be opened for a period of time during such revolution which will be directly proportional to the water pressure or the amount of water flowing through the inlet passage 50. As the upper edge of the cam surface 39 or the step 48 approaches the vertical edge of the cam projection 37, the dog will then automatically snap the ratchet portion over the top and the spring S will force the valve head 33 to a closed position shutting off the sprinkling system.

It can now be seen that there is provided a sprinkling system with a valve for each of the sprinklers in the system and a means operative responsive to the instant water pressure to control the duration that each valve is opened.

Other modes of applying the principle of the invention may be employed, change being made as regards the details described, provided the features stated in any of the following claims or the equivalent of such be employed.

I, therefore, particularly point out and distinctly claim as my invention:

1. A control system for a lawn sprinkler system and the like comprising a manifold, a plurality of outlets in said manifold, a valve for each of said outlets in said manifold, means operative sequentially to operate each of said valves, water pressure responsive means operative to control the duration each of said valves is open, and means responsive to the completion of a selected predetermined plurality of cycles operative to shut off said system.

2. For use in a lawn sprinkler system, a control system comprising a plurality of water outlets, a manifold connected to each of said water outlets comprising a circular housing, a valve for each of said water outlets having vertically movable stems arranged about said housing, a centrally disposed rotatable valve actuator operative sequentially to lift said valve stems when rotated, a water inlet for said manifold, a water motor in said housing operative to be driven by water entering through such inlet, reduction gearing driven by said motor operative to rotate said actuator at a relatively slow speed, means operative to stop said actuator adjacent selected ones of said valves during continued movement of said water motor to increase the duration that selected valves are held open, a shut-off valve, and means responsive to a selected predetermined plurality of revolutions of said actuator operative to close said shut-off valve.

3. A control system for a lawn sprinkler system and the like comprising a manifold, a plurality of outlets in said manifold, a valve for each of said outlets in said manifold, means operative sequentially to operate each of said valves, water pressure responsive means operative to control the duration each of said valves is open, and means responsive to the completion of a selected predetermined number of cycles operative to shut off said system, said shut-off valve including a rotatable valve stem, a ratchet on said valve stem, a pawl on said actuator operative to engage said ratchet and rotate said valve stem through a predetermined limited arc, and means operative longitudinally to move said valve stem to closed position after said valve stem has thus been rotated through a predetermined arc.

4. In a control system, a manifold comprising a circular housing, a plurality of outlets in said housing, a valve for each of said outlets having vertically movable stems, a centrally disposed rotatable valve actuator operative sequentially to lift said valve stems when rotated, said valve actuator including a circumferentially extending valve lifting cam having an inclined leading edge, guide plates on the tops of said vertically movable stems positioned in the path of said lifting cam adapted to be lifted by such inclined leading edge as said actuator rotates the respective valve, a water inlet for said manifold, a water motor in said housing operative to be driven by water entering through said inlet, reduction gearing driven by said motor operative to drive said actuator at a relatively slow speed, a ring gear unit mounted in said housing and adapted to be driven by said reduction gearing, a coiled flat spiral spring interconnecting said reduction gear unit and said valve actuator to provide a resilient lost motion therebetween, ball stop means mounted for movement with said valve actuator, stop fingers for each of said valves operative to engage said ball stop means to stop rotation of said valve actuator adjacent the valve for the respective stop finger, and means operative to remove said ball stop means from engagement with the respective finger whereby said coiled flat spiral spring will move said valve actuator until said ball stop means engages the next succeeding finger.

5. A control system comprising a manifold adapted to be connected to a plurality of lawn sprinklers, said manifold including a circular housing, a valve for each of said sprinklers having vertically movable stems arranged about said housing, a centrally disposed rotatable valve actuator operative sequentially to lift said valve stems when rotated, a water inlet for said manifold, a water motor in said housing operative to be driven by water entering through such inlet, reduction gearing driven by said motor operative to drive said actuator at a relatively slow speed, and means operative momentarily to stop said valve actuator when in lifting engagement with selected ones of said valve stems, whereby the water flow through the selected valves is substantially increased, said last-mentioned means comprising stop fingers normally positioned in the path of said valve actuator to halt the movement thereof when positioned to open the selected valve, and when removed from such path, to permit normal sequential lifting of said valve stems by said valve actuator while being driven by said reduction gearing as aforesaid.

6. For use in a water distribution system for lawns and the like, a control system comprising a plurality of water outlets, a manifold, said manifold comprising a circular housing, a centrally disposed recess in the bottom of said housing, a water inlet extending tangentially into said recess, a water motor comprising an impeller mounted in said recess adapted to be rotated by water entering through such inlet, means interconnecting said outlets and said manifold, a valve for each of said outlets in said manifold, a valve actuator in said manifold operative sequentially to open each of said valves, said water motor driving said valve actuator at a speed responsive to water pressure to control the duration each of said valves is open, a gear housing mounted centrally above said recess and thus said impeller, reduction gearing in said housing, said impeller being connected to said reduction gearing, a ring gear unit mounted on said gear housing and driven by said reduction gearing, and means operative to increase the duration that selected ones of said valves are held open by said valve actuator, said last-mentioned means including a coiled flat spiral spring interconnecting said reduction gear unit and said valve actuator to provide a resilient lost motion therebetween.

7. The control system as set forth in claim 6 including ball stop means mounted for movement with said valve actuator, stop fingers for each of said valves operative to engage said ball stop means to stop rotation of said valve actuator adjacent the valve for the respective stop fingers and means operative to remove said ball stop means from engagement with the respective finger whereby said coiled flat spiral spring will move said valve actuator until said ball stop means engages the next succeeding finger.

8. The control system as set forth in claim 7 including actuator knobs operative to remove said fingers from the path of said ball stop means, and flanges on said actuator knobs interfitting with each other to preclude adjacent stop fingers from being turned to a position clear of the path of said ball stop means.

9. The control system as set forth in claim 3 including a knob operative to rotate said valve stem, a cam adjacent said valve stem operative to lift said valve stem upon such rotation, scale indicia adjacent the knob operative to facilitate the proper positioning of the knob to select a predetermined plurality of sprinkling cycles, and spring means operative resiliently to urge said shut-off valve to a closed position.

10. In a control system for a lawn sprinkler system and the like, a manifold, a plurality of outlets in said manifold, a valve for each of said outlets, water pressure responsive means operative sequentially to open each of said valves, means operative to increase the length of time that said valves are normally held in such open position by said water pressure responsive means, and means responsive to the completion of a selected predetermined plurality of cycles operative to shut off the system.

References Cited by the Examiner
UNITED STATES PATENTS

| | | | |
|---|---|---|---|
| 1,753,240 | 4/1930 | Howell et al. | 137—119 |
| 2,589,650 | 3/1952 | Wolcott | 137—119 |
| 2,642,076 | 6/1953 | Tigert et al. | 137—119 |
| 2,781,050 | 2/1957 | Edwards | 137—119 |

EVERETT W. KIRBY, *Primary Examiner.*

LOUIS J. DEMBO, *Examiner.*